July 1, 1941. W. F. GROENE 2,247,550
CRANKSHAFT CHUCK
Filed Jan. 2, 1940 7 Sheets-Sheet 2
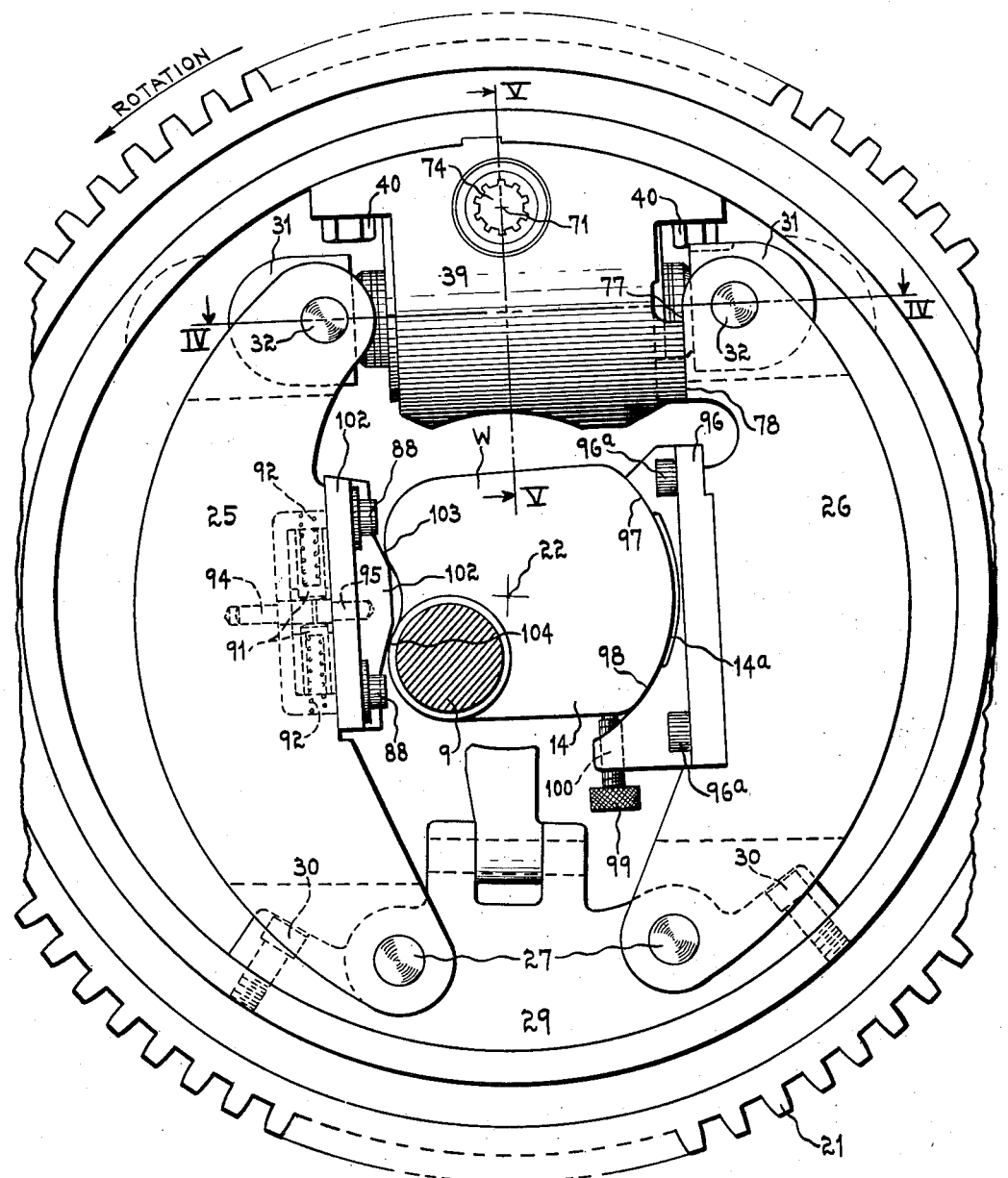
Fig. II.
INVENTOR.
WILLIAM F. GROENE
BY *Willard L. Groene*
ATTORNEY.

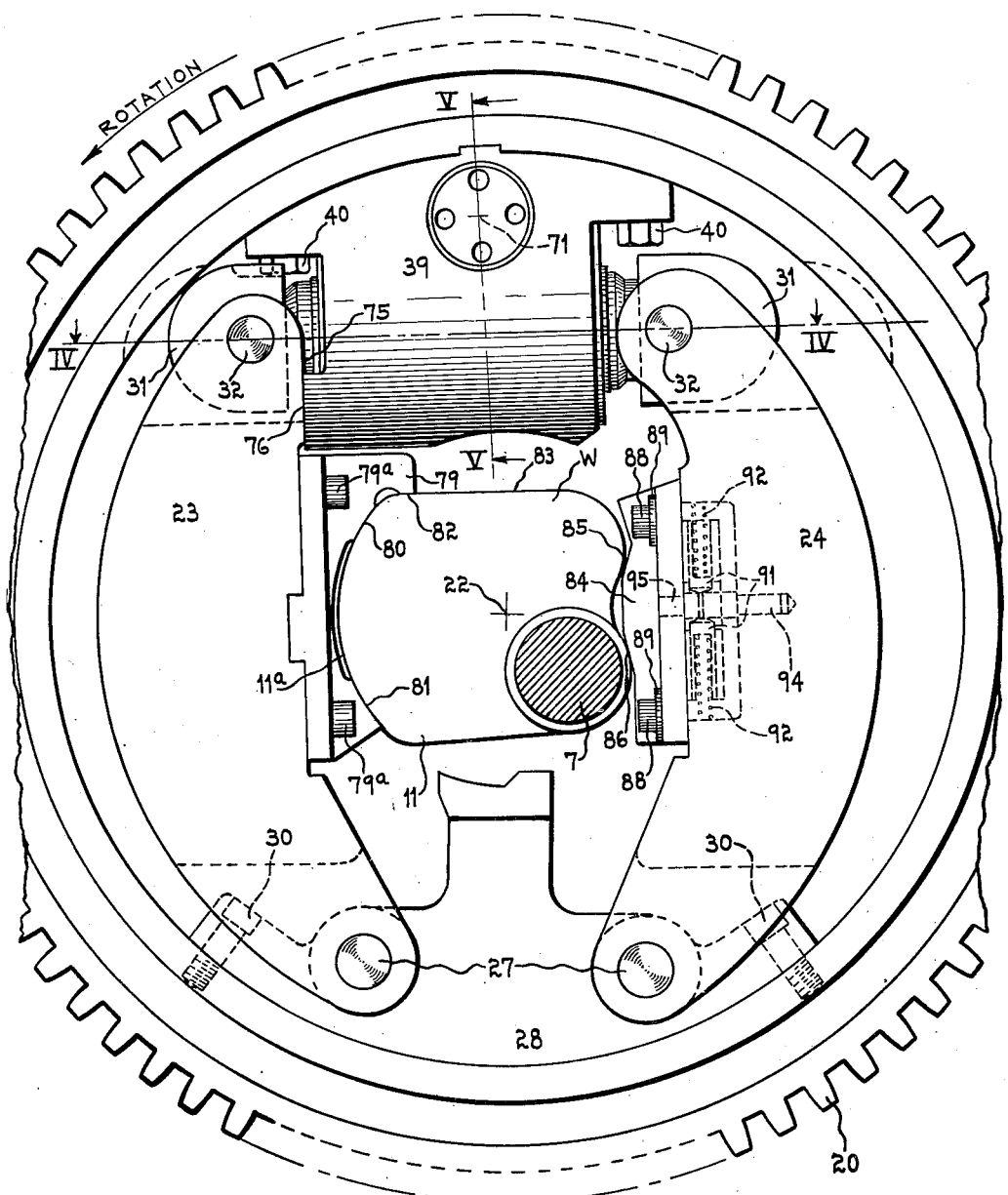
Fig. I
INVENTOR.
WILLIAM F. GROENE
BY Willard S. Groene
ATTORNEY.

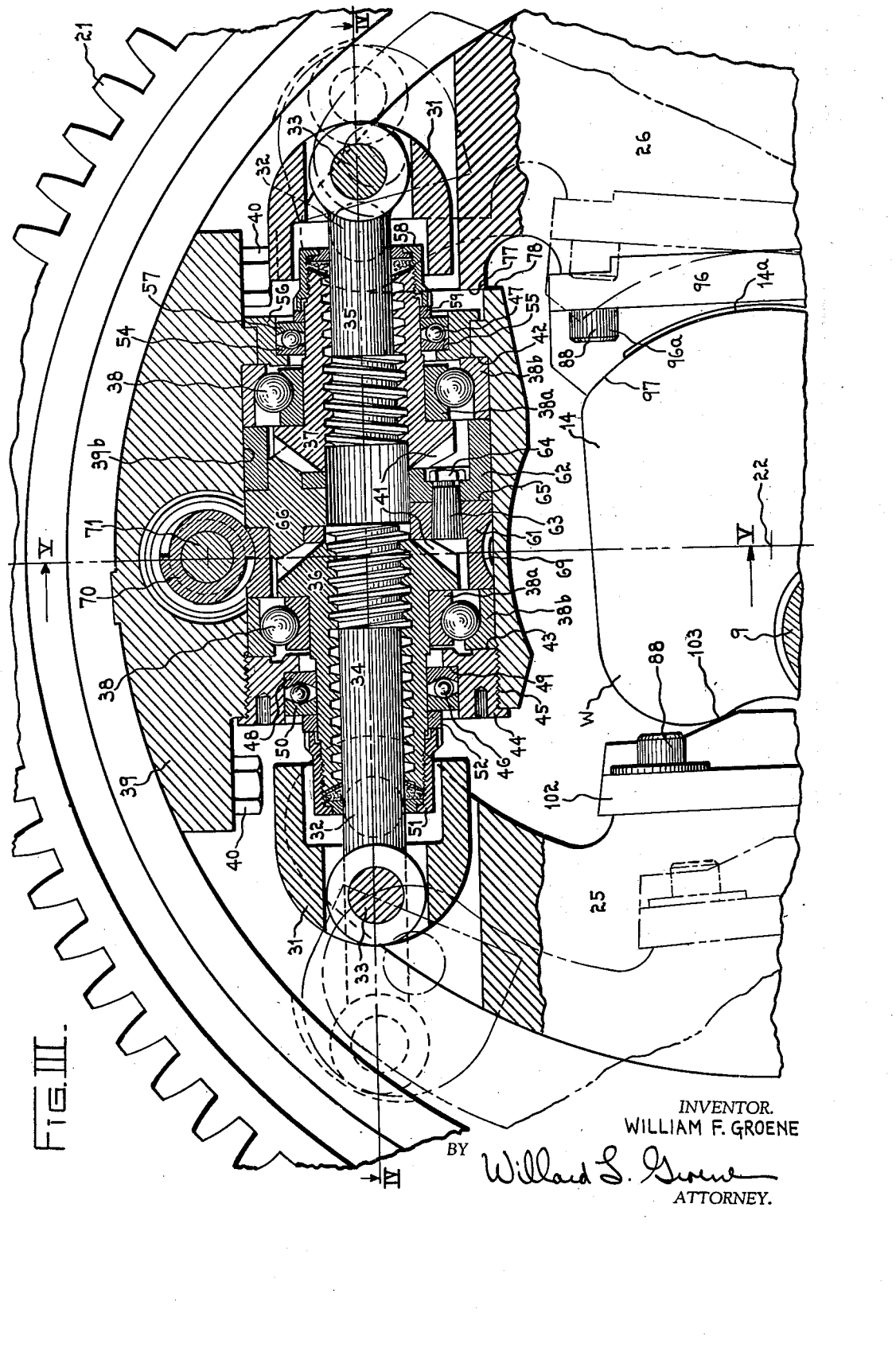

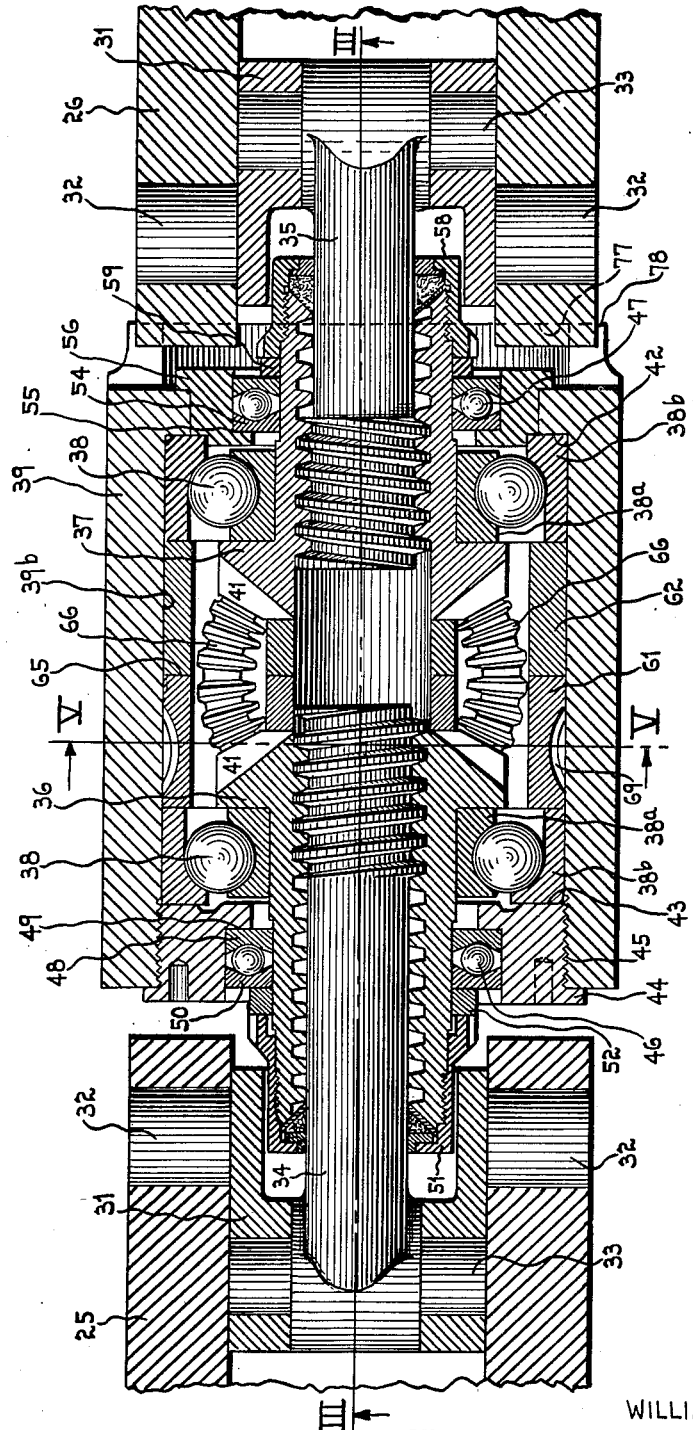

July 1, 1941.  W. F. GROENE  2,247,550
CRANKSHAFT CHUCK
Filed Jan. 2, 1940    7 Sheets-Sheet 5
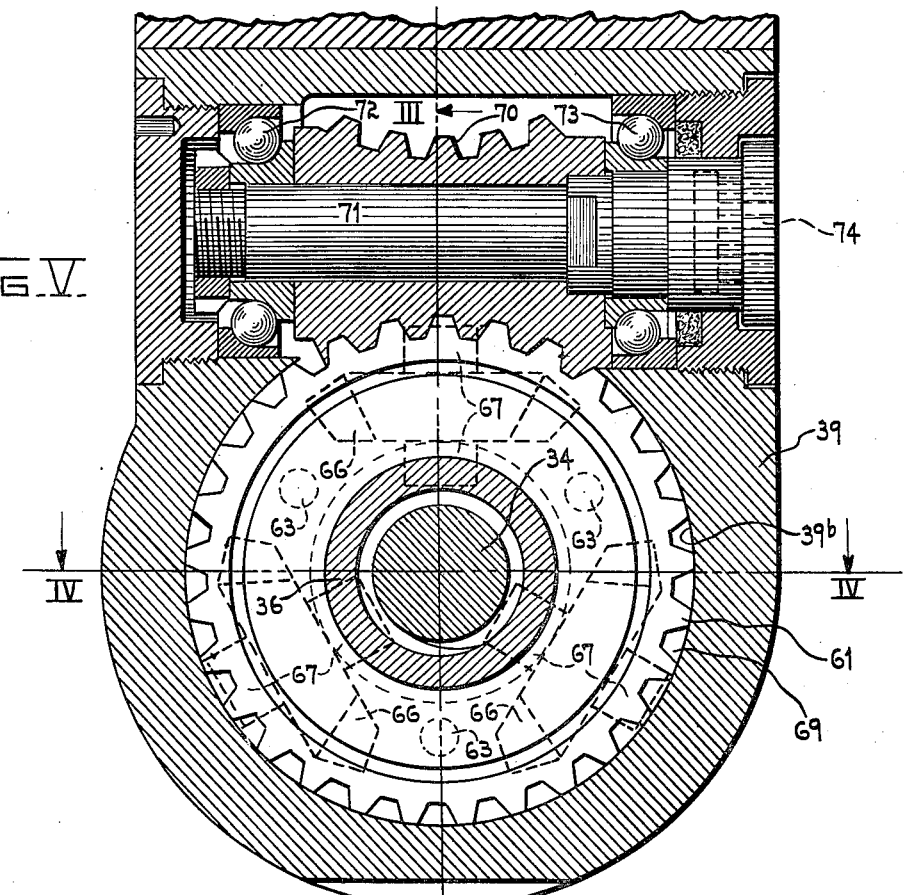
Fig. V
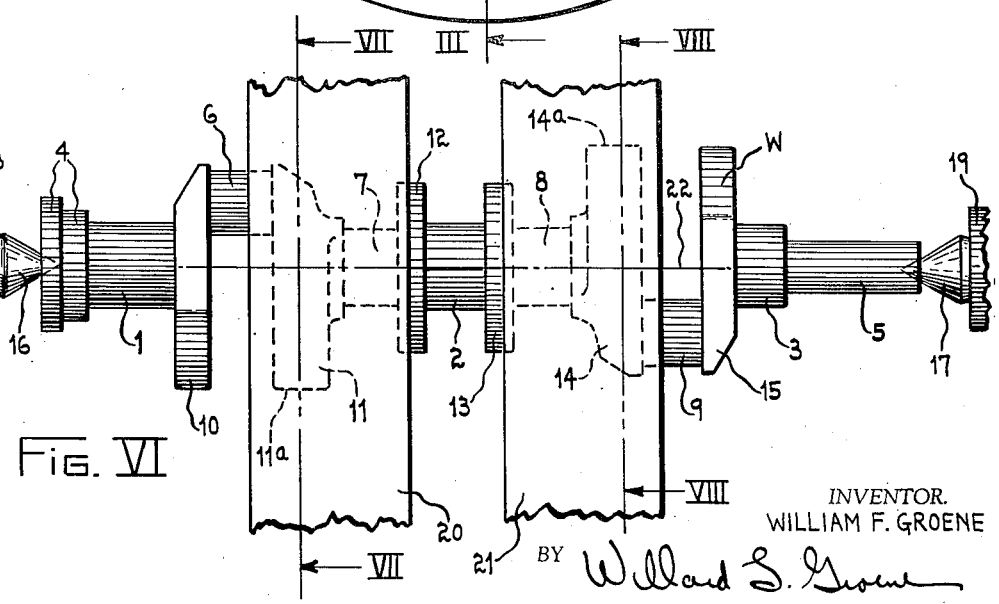
Fig. VI
INVENTOR.
WILLIAM F. GROENE
BY Willard S. Groene
ATTORNEY.

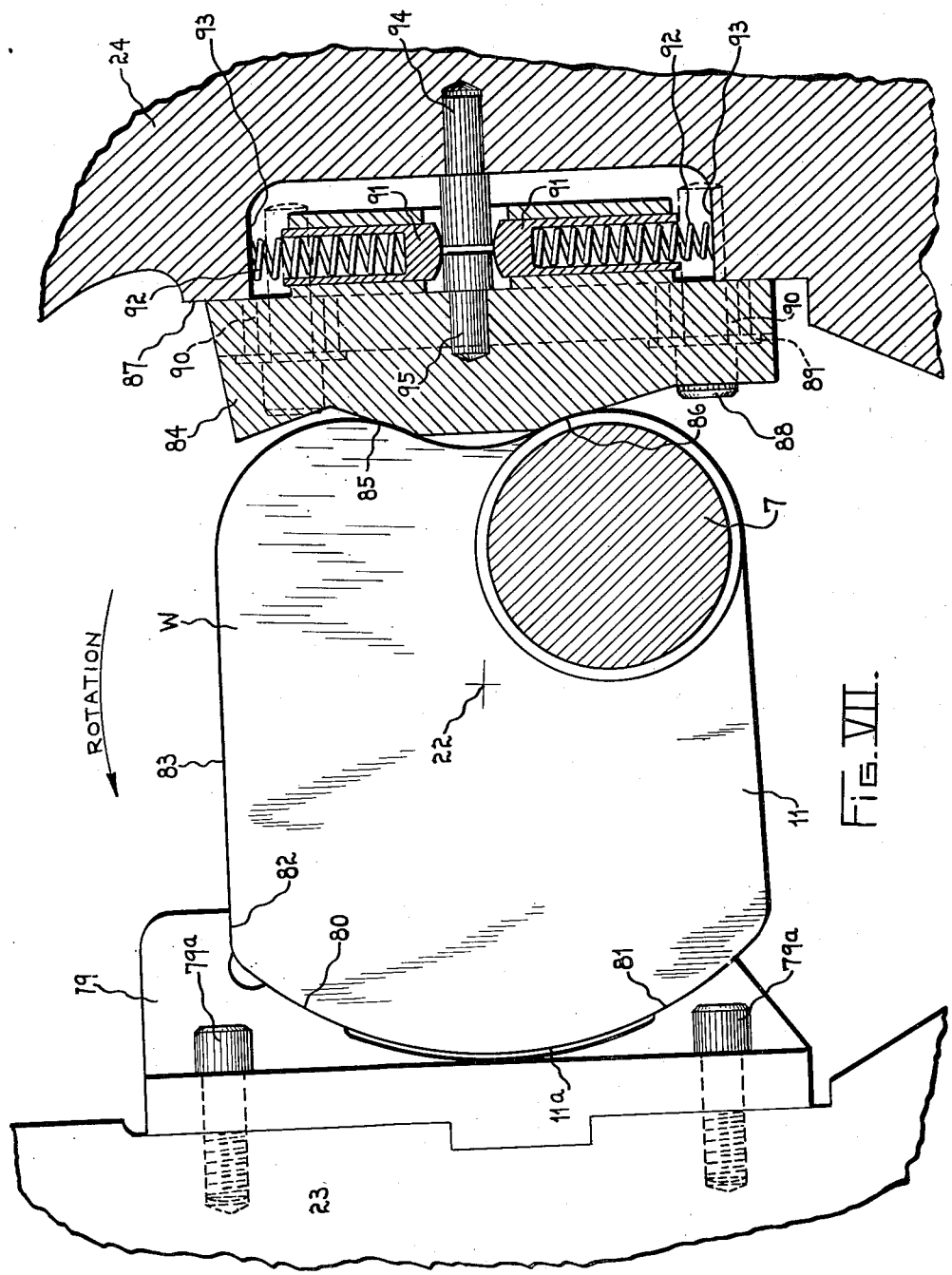

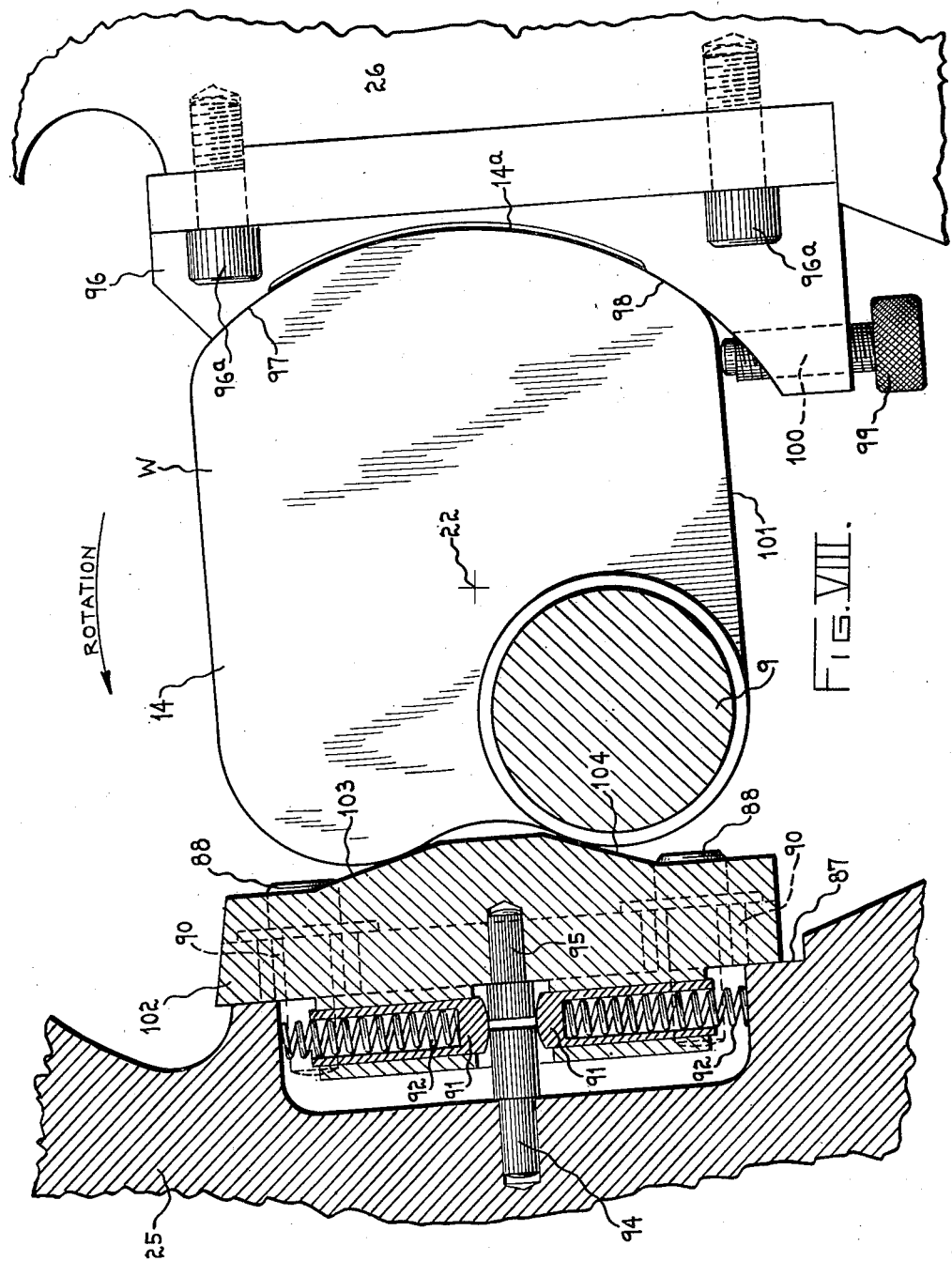

Patented July 1, 1941

2,247,550

UNITED STATES PATENT OFFICE 2,247,550

CRANKSHAFT CHUCK

William F. Groene, Cincinnati, Ohio, assignor to The R. K. Le Blond Machine Tool Company, Cincinnati, Ohio, a corporation of Delaware Application January 2, 1940, Serial No. 312,066

17 Claims. (Cl. 82—40)

This invention pertains to the chucking of work pieces in lathe, particularly in the chucking of crankshafts in center drive crankshaft line bearing lathes for the purpose of machining its line bearing portions. This invention is especially related to chucking mechanism for gripping a prelocated work piece by means of premachined locating surfaces on the sides of crankshaft webs.

One of the main objects of this invention is to provide a chucking device having movable locating members which may be brought to definite predetermined located position in the chuck to engage premachined locating surfaces on a work piece in the chuck which has been previously prelocated on the axis of rotation of the lathe, and then to provide in conjunction with such work engaging mechanism, suitable clamping devices operating in cooperation therewith for securely binding the work piece to the work engaging members of the chuck without in any way distorting said work piece from its true located position on the axis of rotation of the lathe.

Another object of this invention is to provide a chucking device having a pair of work engaging jaws located on each side of the axis of rotation of the chucking device in the lathe in which one of the jaws is moved toward a definite fixed position relative to the work spindle of the lathe upon which it is mounted and which jaw carries an accurate locating abutment member for engaging premachined locating surfaces on the work piece, prelocated on the axis of rotation of the lathe; the other clamping member being arranged to provide clamping action to securely bind the work piece thus engaged by the first abutment jaw and hold this work piece in engagement with said jaw and on the exact axis of alignment of prelocation of the work piece in the lathe.

Another object of this invention is to provide in a chucking mechanism for lathe a differential screw operated mechanism carried on the work spindle of such a lathe actuating a pair of opposed clamping members which may be thereby moved to and from a work piece prelocated on the axis of rotation of the work spindle. In this arrangement one of the work engaging members carries a locating abutment means adapted to engage premachined locating surfaces on said work piece, the other effecting said clamping action of said work piece to said abutment member and to provide means for accurately positioning said abutment member work engagement means in a predetermined position relative to the axis of rotation of the work spindle.

Another object of this invention is to provide a chucking device adapted to engage a prelocated work piece on the axis of rotation of a lathe, said work piece having peripheral locating areas which are engaged by a chucking member which is brought to a predetermined position in the chuck body and fixed therein at the instant it engages said peripheral locating areas on the work, and to provide clamping mechanism co-operating with said chucking member for holding the work piece in proper engagement with said member and on the proper axis of rotation of the lathe.

Another feature of this invention is to provide in a chucking device on a rotary work spindle, a differential screw operated mechanism for actuating a pair of swinging work engaging members mounted on the work spindle, and to provide in one of said work engaging members an abutment member adapted to engage a premachined locating area on a work piece, prelocated on the axis of rotation of said work spindle, and to provide means for accurately limiting movement of the work engaging members toward the work to a predetermined position so that the abutment member will be stopped from movement toward said axis at the instant its abutment member engages a premachined locating surface on the work piece, and to provide clamping mechanism in conjunction with said chucking members.

Further features and advantages of this invention will appear from the detailed description of the drawings in which:

Fig. I is an end elevation of one of the center drive ring gears of a double center drive crankshaft lathe showing an exemplary application of this chucking mechanism to gripping a prelocated crankshaft having premachined peripheral locating areas on its webs.

Fig. II is an end elevation similar to that of Fig. I showing this chucking mechanism as applied in the other of said center drive ring gears.

Fig. III is an enlarged section through the differential nut and screw arrangement for operating the clamping means, shown substantially on the line III—III of Figs. IV and V.

Fig. IV is an enlarged section through the mechanism of Fig. III, substantially on the line IV—IV of Figs. I, II, III and V.

Fig. V is a vertical transverse section through the differential nut and screw arrangement substantially on the line V—V of Figs. I, II, III, and IV.

Fig. VI is a diagrammatic view showing the relationship of the centers for supporting the ends of a crankshaft and the double center drive chucking devices incorporating the chucking mechanism of this invention.

Fig. VII is an enlarged section through the work engaging jaws of the chucking mechanism of Fig. I substantially on the line VII—VII of Fig. VI.

Fig. VIII is an enlarged section through the work engaging jaws of the chucking mechanism of Fig. II substantially on the line VIII—VIII of Fig. VI.

For illustrative purposes this invention is shown applied to chucking a crankshaft having premachined peripheral locating areas on its webs, of a character for example as outlined in Patent 2,141,466, dated December 27, 1938, which is to be chucked in a double center drive crankshaft lathe of a character shown in patent, Re. 20,090 and 2,069,107. Noting Fig. VI, a typical crankshaft W to be machined in such a lathe, comprises the line bearings 1, 2, and 3 and the flange end 4 and the stub end 5 which are to be turned, the pin bearings 6, 7, 8 and 9 and the interconnecting rough irregular webs, 10 to 15, inclusive. The ends of the crankshaft W are supported in the usual lathe centers 16 and 17 carried in appropriate tailstocks, 18 and 19. Intermediate these centers are the center drive ring gears 20 and 21 which completely surround the crankshaft W and are driven in any suitable manner as outlined in the above Patent 2,069,107. Chucking mechanism in these ring gears 20 and 21, which will be described in detail, have appropriate work engaging members which contact the premachined peripheral locating surfaces, 11a, and 14a prepared on the respective webs 11 and 14 in a manner outlined in the above cited Patent 2,141,466.

In each of these ring gears 20 and 21 is mounted respectively the chucking mechanism of Figs. I and II. The chief function of this mechanism being to rigidly grip, support, and drive the crankshaft W by engaging the respective premachined peripheral locating areas 11a and 14a of the webs 11 and 14 of the crankshaft without distorting the shaft from its true axis of rotation 22, previously established by placing the crankshaft on the centers 16 and 17 engaged with the ends of the work.

In each of the ring gears 20 and 21 are respectively provided clamping arms 23 and 24, and 25 and 26, each pivotally mounted on pins 27 carried in the segmental blocks 28 and 29 fixed in these ring gears by suitable screws 30. In the upper ends of these clamping arms (Figures III and IV) are pivotally mounted the crankshafts 31 on suitable trunnions 32 which are connected by means of the pinions 33 to the screws 34 and 35 which operate in the rotatable nuts 36 and 37 carried in the thrust bearings 38 in the bore 39b of the differential housing 39 fixed in the ring gears by suitable screws 40. On each of these nuts are formed bevel gears 41 which take the outward thrust of these nuts against the inner races 38a of the bearings 38. The outer races 38b are axially confined in the bore 39b by the shoulder 42 of the housing 39 and the face 43 of the bushing 44 threaded at 45 in this bore. Inward thrust on these nuts 36 and 37 is taken care of by the thrust bearings 46 and 47, the bearing 46 having its inner race 48 bearing against the face 49 of the bushing 44 while its outer race 50 abuts against the adjusting nut 51, threaded to the nut 36, through the thrust collar 52. Similarly the bearing 47 has its inner race 54 bearing against the face 55 of the bushing 56 fixed in the housing 39 while its outer race 57 abuts against the adjusting nut 58 threaded to the nut 37 through the thrust collar 59.

Journaled in the bore 39b of the housing 39 is the differential cage comprising the worm ring 61 and the plain ring 62 which are fixed together by tapered pins 63 and nut 64. This cage is thus parted on the line 65 so that the bevel pinions 66 simultaneously engage the bevel gears 41 of the nuts 36 and 37 in order that rotation of the cage causes one or the other or both of said nuts to rotate with equal force. On the worm ring 61 is formed a worm wheel 69 which is engaged by the worm 70 (Fig. V) fixed on the actuating shaft 71 journaled on the bearings 72 and 73 in the housing 39, the end of this shaft 71 being provided with suitable splined socket 74 into which may be inserted an appropriate wrench for rotating it for actuating the differential cage for moving the clamping arms to or from the work W.

On the clamping arm 23 is formed the machined abutment surface 75 which is adapted to engage a mating abutment surface 76 accurately machined on the differential housing 39, so as to accurately and positively limit the inward movement of the arm 23 relative to the work axis 22. Similarly the clamping arm 26 is provided with a machined abutment face 77 which is arranged to engage an abutment surface 78 provided on the differential housing 39 in the ring gear 21, to thereby limit the inward travel of this arm 26 relative to the work axis 22.

On the arm 23 is fixed locating abutment work engaging jaw 79, by suitable screws 79a, as best seen in Fig. VII, having arcuate locating surfaces 80 and 81 which are arranged to nicely contact the peripheral locating surface 11a on the web 11 of the crankshaft W prelocated on the axis of rotation 22 in the lathe on the centers 16 and 17. On this fixed work engaging jaw 79, associated with the arcuate abutment surfaces 80 and 81, is the driving abutment 82 which engages the rough web surface 83 of the crankshaft web 11 for purposes of driving the crankshaft W, in the instance shown in Figure VII in a counter-clockwise direction. Thus when the arm 23 is moved so its surface 75 engages the surface 76 of the differential housing 39 by operation of the differential mechanism in rotating the worm shaft 71 causes the abutments 80 and 81 of the jaw 79 to nicely contact the surface 11a of the web 11 of the crankshaft so as not in any way disturb its prelocated position on the axis 22 of the lathe. Further operation of the differential mechanism associated with this clamping arm 23 in rotating of the shaft 71 causes the other clamping arm 24 to continue to move inwardly toward the crankshaft after the jaw 23 has been stopped by the abutment 76 of the housing 39. On this arm 24, which is the clamping arm, is provided a floating work engaging clamping jaw having a sliding mounting in a plane substantially perpendicular to the direction of clamping action of the arm 24. This jaw comprises a block 84 having the work engaging surfaces 85 and 86 adapted to engage rough surfaces on the web 11 of the crankshaft W. This jaw has vertical sliding movement, as shown in Fig. VII, along the surface 87 of the arm 24 and is maintained in sliding position by appropriate screws 88 and washers 89 passing through clearance holes 90 in the block 84. Means for automatically centering said jaw 84 in yielding position is provided by a series of spring urged plungers 91 having springs 92 engaging surfaces 93 of the arm 24 and engaging simultaneously the pin 94 fixed in the arm 24 and the pin 95 fixed in the jaw 84, so that when disengaged from the work this jaw will find a substantially central position as shown so that when the jaw 24 is brought up to the crankshaft web its respective surfaces 85 and 86 will be in the best contacting position for firmly engaging itself on the rough web to positively hold the crankshaft against deviation away from the arcuate locating surfaces 80 and 81 of the fixed work engaging jaw 79. Thus with this arrangement the jaw 84 will float to firm engaged position with both of its surfaces 85 and 86 engaging the rough work surfaces with equal force so as to maintain rigid support for this portion of the crankshaft in conjunction with the arcuate locating and supporting surfaces 80 and 81 of the fixed jaw 79.

Similarly, the clamping arm 26 is provided with a fixed locating jaw 96 fixed to it by suitable screws 96a, this jaw having arcuate locating surfaces 97 and 98 which nicely contact the peripheral locating surface 14a premachined on the crankshaft web 14 when the surface 77 of the jaw 26 is drawn up against the face 78 of the differential housing 39 in the ring gear 21. A driving abutment screw 99 is provided in a threaded hole 100 in the jaw 96 and is adapted to be lightly turned down against the surface 101 of the crankshaft web 14 when chucked up in a lathe, when the surface 82 of the web 11 is in contact with the driving abutment 82, to provide a solid positive driving of this web 14. The clamping arm 25 is also provided with a floating work engaging clamping jaw 102 similarly floatingly mounted by the same means as described for the jaw 84, in the clamping arm 25 which has work engaging surfaces 103 and 104 which appropriately engage the rough surfaces of the web 14 to hold this web against movement away from the arcuate locating surfaces 97 and 98 of the jaw 96.

Thus with this arrangement we have provided a chucking mechanism which is adapted to engage and accurately support and rotate a crankshaft which has been prelocated on the axis of rotation 22 of the lathe and which is engaged by means of machined surfaces on the periphery of the webs of the crankshaft by a chucking jaw which moves up to an accurate predetermined position in contact with these work surfaces and then to provide clamping means cooperating with this chuck jaw to properly hold the crankshaft in position with this jaw. We have, therefore, provided a chuck which is arranged to engage, support, and rotate accurately a prelocated work piece by means of premachined locating surfaces on the work piece.

Having thus fully set forth and described my invention, what I claim as new and desire to secure by United States Letters Patent is:

1. In a center drive crankshaft lathe, centers for supporting the ends of the crankshaft in prelocated axial position in the lathe, a center drive ring gear rotatably mounted intermediate said centers, chucking mechanism in said ring gear comprising a movable abutment member adapted to be moved to a predetermined position relative to the axis of rotation of said lathe, arcuate abutment surfaces on said abutment member adapted to engage a premachined peripheral locating surface on the web of said crankshaft, a driving abutment associated with said arcuate abutment for rotating said crankshaft by the rotation of said ring gear, and clamping means associated with said abutment means to effect proper positioning of said crankshaft on said abutment means while maintaining it accurately on the axis of rotation of said lathe.

2. In a double center drive crankshaft lathe, centers for supporting the ends of a crankshaft to be machined in said lathe, a pair of center drive ring gears mounted intermediate said centers, chucking mechanism in each of said ring gears having members movable to a fixed position in said ring gears, each of said members having arcuate abutment jaws adapted to nicely engage arcuate premachined locating surfaces on the periphery of the webs of said crankshaft when moved to said fixed position in said ring gears, a fixed driving abutment associated with the arcuate abutments of one of said ring gears, an adjustable driving abutment associated with the arcuate abutment members in the other of said ring gears, and clamping means in both of said ring gears associated with said abutments to maintain said crank shaft webs in proper engagement therewith while maintaining said crankshaft in proper axial alignment on the axis of rotation of said lathe.

3. In a chucking device for machine tools, a rotary chuck body, a pair of work engaging arms movable from opposite directions relative to the axis of rotation of said chuck body, means for limiting the movement of one of said members to a definite predetermined position, accurate abutment means on said limited member adapted to nicely engage premachined locating surfaces on a work piece placed on the axis of rotation of said lathe when said member is moved to its limited position, and means for continuing movement of said other arm after said first member has reached its limited position in the chuck body to affect a clamping action of the work piece against the abutment means of said limited member.

4. In a rotary chucking device, a pair of clamping arms pivotally mounted on said device, differential operating mechanism for swinging said clamping arms with equal force relative to the axis of rotation of said chuck body, means for accurately limiting the inward movement of one of said arms, accurate abutment members on said limited arm adapted to nicely engage premachined locating areas on a work piece, prelocated in the chucking device on its axis of rotation, when moved to its limited position, and means permitting the continuation of the movement of said other clamping arm for engagement with said work piece to hold it in proper engagement with said limited arm.

5. In a lathe, a rotary chuck body, a pair of clamping arms pivotally mounted on said chuck body, differential operating mechanism for swinging said arms with equal force relative to the axis of rotation of said chuck body, means for arresting movement of one of said arms at a predetermined position relative to said axis, accurate abutment means on said limited member, means permitting continued movement of the other of said arms after said first mentioned arm is moved to limited position, and an equalizing work engaging member on said other arm adapted to engage a work piece located on the axis of rotation of said chuck, the abutment of said first mentioned limited arm being adapted to nicely engage premachined locating surfaces on said work piece when moved to limited position.

6. In a chuck, a pair of clamping means arranged to engage a work piece in said chuck from opposite sides, means for moving each of said clamping means toward said work with equal force, means in connection with said last mentioned means for automatically locking said clamping means in engaged position with said work piece, and means for limiting the movement of one of said clamping means to a predetermined accurate position relative to said work piece.

7. In a chuck, a rotatable chuck body, clamping means movably mounted on said body, differentially operated means for moving said clamping means relative to a work piece in the chuck, means incorporated in said differential means for automatically locking said clamping means to said chuck body when said differential means is not operating, and means for limiting movement of said clamping means to a predetermined position relative to said chuck body.

8. In a chuck, a rotatable chuck body, clamping means movably mounted on said body relative to a work piece in said chuck, work engaging members on said clamping means, means for moving said clamping means with equal force, means for automatically locking said clamping means to said chuck body when said members are engaged with said work piece, and means on said chuck body for limiting movement of said clamping means to a predetermined position relative to said work piece.

9. In a chuck, a rotatable chuck body, clamping means movably mounted on said body relative to a work piece in said chuck, means on said chuck body for accurately limiting the movement of some of said clamping means, work engaging members movably mounted on some of said clamping means for movement substantially perpendicular to the direction of movement of said clamping means, and means for moving said clamping means to engage said members on a work piece in the chuck.

10. In a chuck, a rotatable chuck body, clamping means movably mounted on said body relative to a work piece in said chuck, work engaging members some fixed and others movably mounted on said clamping means, means for moving said clamping means to engage said members on said work piece with equal force, means for automatically locking said clamping means on said chuck body and said members to said clamping means when said members are engaged with said work piece, and means for accurately limiting the movement of the clamping members with the fixed work engaging members.

11. In a chuck, a rotatable chuck body, clamping means movably mounted on said body relative to a work piece in said chuck, work engaging members some fixed and others movably mounted on said clamping means, a single operating means for moving said clamping means to engage said members on said work piece with equal force, means for automatically locking said clamping means on said chuck body and said members to said clamping means when said members are engaged with said work piece, and means for accurately limiting the movement of the clamping members with the fixed work engaging members.

12. In a chuck, a rotary chuck body, a pair of clamping arms pivotally mounted to one side of the axis of rotation of said chuck body, a pair of nuts journaled against axial movement in said body on the other side of said axis, screws operating in said nuts each connected to one of said arms, a bevel gear formed on each of said nuts, a differential cage carrying rotatable bevel pinions engaging the bevel gears on said nuts journaled in said body, accurate abutment means on one of said arms to engage premachined peripheral locating areas on a prelocated work piece in the chuck, means for rotating said cage to effect movement of said arms relative to said work piece, and means on said chuck body to accurately limit movement of said arm with the accurate abutment to a predetermined position in the chuck body.

13. In a chuck, a rotatable chuck body, a pair of clamping means movably mounted on said body relative to a work piece in said chuck, work engaging members, one fixed on one of said clamping means the other movable on the other of said clamping means, differential actuating means for simultaneously actuating said clamping means to engage said work engaging means on said work piece, and means for accurately positioning the clamping means, having the fixed work engaging member, (fixidly on the chuck body) as it engages said work piece.

14. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, an accurate work engaging abutment jaw fixed on one of said clamping members, a work clamping jaw movable on the other of said members substantially perpendicular to the direction of movement of said clamping members, differential actuating mechanism mounted in said ring gear for said clamping members to effect engagement of said jaws with equal force on said work piece.

15. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, an accurate work engaging abutment jaw fixed on one of said clamping members including a fixed driving abutment, a work engaging clamping jaw movable on the other of said members substantially perpendicular to the direction of movement of said clamping members, and differential actuating mechanism mounted in said ring gear for said clamping members to effect engagement of said jaws with equal force on said work piece and a chucking device in the other of said ring gears for gripping said work piece comprising a pair of clamping members movably mounted on said other ring gear, an accurate work engaging jaw fixed on one of said clamping members including an adjustable driving abutment, a work engaging clamping jaw movable on the other of said members, substantially perpendicular to the direction of movement of said clamping members in this other chuck, and differential actuating mechanism mounted in this ring gear for said clamping members to effect engagement of said jaws with equal force on said work piece and means in connection with the clamping members with said fixed jaws for automatically locating said jaws in a predetermined fixed position relative to said work piece in said chucking devices.

16. In a lathe, chucking mechanism for gripping and holding a work piece, having premachined locating surfaces, on the axis of rotation of said lathe comprising, a chuck body, an abutment member movably mounted on said body for engagement with the locating surfaces on said work piece, means on said chuck body to accurately limit the movement of said abutment member toward said work piece, and clamping means on said chuck body to hold said work piece against said abutment member.

17. In a lathe, chucking mechanism for gripping and holding a work piece, having premachined peripheral locating surfaces, on the axis of rotation of said lathe comprising a chuck body, an arcuate abutment member movably mounted on said body for engagement with the peripheral locating surfaces on said work piece, means on said chuck body to accurately limit the movement of said abutment member toward said work piece to a predetermined accurate position relative to the axis of rotation of said lathe, and clamping means on said chuck body to hold said work piece against said abutment member.

WILLIAM F. GROENE.